(12) United States Patent
Nayak

(10) Patent No.: US 10,834,073 B2
(45) Date of Patent: Nov. 10, 2020

(54) SECURE AND CONFIDENTIAL SHARING OF DIGITAL CONTENT

(71) Applicant: Prakash Nayak, Karnataka (IN)

(72) Inventor: Prakash Nayak, Karnataka (IN)

(*) Notice: Subject to any disclaimer, the term of this patent is extended or adjusted under 35 U.S.C. 154(b) by 197 days.

(21) Appl. No.: 14/719,071

(22) Filed: May 21, 2015

(65) Prior Publication Data

US 2016/0344720 A1     Nov. 24, 2016

(51) Int. Cl.
| | | |
|---|---|---|
| *H04L 29/06* | (2006.01) | |
| *G06F 15/16* | (2006.01) | |
| *G06F 7/04* | (2006.01) | |
| *H04W 12/02* | (2009.01) | |
| *H04W 4/12* | (2009.01) | |
| *H04W 12/06* | (2009.01) | |
| *H04L 12/58* | (2006.01) | |

(52) U.S. Cl.
CPC ........... *H04L 63/083* (2013.01); *H04L 63/04* (2013.01); *H04W 12/02* (2013.01); *H04L 51/00* (2013.01); *H04W 4/12* (2013.01); *H04W 12/06* (2013.01)

(58) Field of Classification Search
CPC ....... H04L 63/083; H04L 63/04; H04L 51/00; H04W 12/02; H04W 4/12; H04W 12/06
USPC .......................................................... 726/5
See application file for complete search history.

(56) References Cited

U.S. PATENT DOCUMENTS

| | | | | |
|---|---|---|---|---|
| 5,483,595 A * | 1/1996 | Owen | ................... | H04L 9/0838 340/7.51 |
| 7,849,213 B1 * | 12/2010 | Borghetti | ................ | H04L 51/12 707/609 |
| 8,166,118 B1 * | 4/2012 | Borghetti | ............... | H04L 12/585 707/922 |
| 8,355,711 B2 * | 1/2013 | Heins | ................... | H04M 3/4872 455/418 |
| 8,863,284 B1 * | 10/2014 | Polyakov | ............... | H04L 63/145 726/22 |
| 9,553,860 B2 * | 1/2017 | Meyer | ..................... | G06F 21/62 |
| 2009/0019553 A1 * | 1/2009 | Narayanaswami | ......................... | H04L 63/0428 726/28 |

(Continued)

OTHER PUBLICATIONS

Karim El Defrawy; Leveraging Social Contacts for Message Confidentiality in Delay Tolerant Networks; 2009 33rd Annual IEEE International Computer Software and Applications Conference; p. 271-279.*

*Primary Examiner* — Monjur Rahim
(74) *Attorney, Agent, or Firm* — Jefim Kirshner, Esq.

(57) ABSTRACT

A method of sharing confidential digital content among a plurality of participants, each utilizing one or more digital communication devices connected to a network, the method including providing one or more units of content each unit comprising at least one element to one or more digital communication device belonging to at least one of the plurality of participants; on any of the digital communication devices comprising the one or more units: receiving a selection of at least one element from a participant; designating the selection as confidential, and hiding the designated selection from view on the digital communication devices; on any of the digital communication devices comprising the designated selection: authenticating a passcode from a viewing participant of the plurality of participants; receiving a request to view the designated selection from the viewing participant; and displaying the designated selection to the viewing participant.

20 Claims, 12 Drawing Sheets

(56) References Cited

U.S. PATENT DOCUMENTS

| | | | |
|---|---|---|---|
| 2014/0208418 A1* | 7/2014 | Libin | G06F 21/6209 726/19 |
| 2015/0150147 A1* | 5/2015 | Keohane | G06F 21/6209 726/28 |
| 2015/0163182 A1* | 6/2015 | Chandrasekaran | H04L 51/063 709/204 |
| 2016/0164816 A1* | 6/2016 | Bhagwan | H04L 51/18 709/206 |
| 2016/0241530 A1* | 8/2016 | Andreev | H04L 51/12 |

* cited by examiner

SECURE AND CONFIDENTIAL SHARING OF DIGITAL CONTENT

FIELD OF INVENTION

The present system relates to secure and confidential sharing of digital content.

BACKGROUND OF INVENTION

Wired and wireless digital communication devices are becoming ubiquitous and indispensable in daily activities of people worldwide. Such digital communication devices include personal computers, laptops, notebooks, netbooks, tablets, smart televisions, smart phones, watches and other similar gadgets, too numerous to list. Connections between these devices are enabled by the Internet and many varieties of other electronic networks, like the wireless 3G and 4G networks, which connect wired and wireless digital communication devices amongst themselves and to the Internet.

Hundreds of millions, probably billions of users of these digital communication devices communicate amongst themselves most commonly through Internet based or on-line communication applications, such as, text messengers; various e-mail services; social networks, e.g., Facebook, Twitter, Instagram, Linkedin, tumblr, flickr, Pinterest, etc.; numerous dating services; and many, many others. This communication amongst users via the on-line communication applications using the digital communication devices often entails sharing content. This shared digital content is commonly maintained on the personal digital communication devices and in databases stored on servers on-line, i.e., on the Internet.

With great frequency personal digital content, e.g., private texts, personal photographs, bank and credit card account information, contact lists, password and login information for access to personal on-line accounts, etc., maintained on digital communication devices, is becoming prey to hackers and unscrupulous individuals without authorization from the owners. For example, on Nov. 24, 2014 Sony Pictures Entertainment Company was hacked. Confidential content belonging to Sony Pictures Entertainment and many of its employees, i.e., employees' personal e-mails, was stolen and some made public.

Prior to the inventive system discussed in the instant document, the solution to protect the privacy of, or secure the content on the networked devices and on-line databases was to disconnect the devices from the networks, cancel the on-line accounts, stop using the on-line services, e.g., e-mail, and stop texting and pixing, i.e., sending SMS and multi-media messaging.

This solution is unacceptable in today's interconnected world. Therefore, what is needed is a way to keep the communication of content including messaging and files, secure and confidential.

SUMMARY OF INVENTION

It is an object of the present inventive system to overcome disadvantages and/or make improvements in the prior art.

It is an object of the inventive system to enable secure and confidential sharing of digital content.

It is still another object of the present inventive system to enable secure and confidential sharing of digital content that includes attached files and/or elements of these files;

It is another object of the present inventive system to enable control duration of retention of the digital content on participants' digital communication devices.

It is yet another object of the present inventive system to enable control of duration of retention of the digital content such that the digital content is removed from the digital communication devices upon demand and upon a preset condition.

Provided is a method of sharing confidential digital content among a plurality of participants, each utilizing one or more digital communication devices connected to a network, the method includes providing one or more units of content each unit comprising at least one element to one or more digital communication device belonging to at least one of the plurality of participants; on any of the digital communication devices comprising the one or more units: receiving a selection of at least one element from a participant; designating the selection as confidential, and hiding the designated selection from view on the digital communication devices. Further, the method provided, on any of the digital communication devices comprising the designated selection: authenticating the passcode from a viewing participant of the plurality of participants; receiving a request to view the designated selection from the viewing participant; and displaying the designated selection to the viewing participant.

BRIEF DESCRIPTION OF DRAWINGS

The invention is explained in further detail, and by way of example, with reference to the accompanying drawings wherein.

DETAILED DESCRIPTION OF INVENTION

Figure 1B:
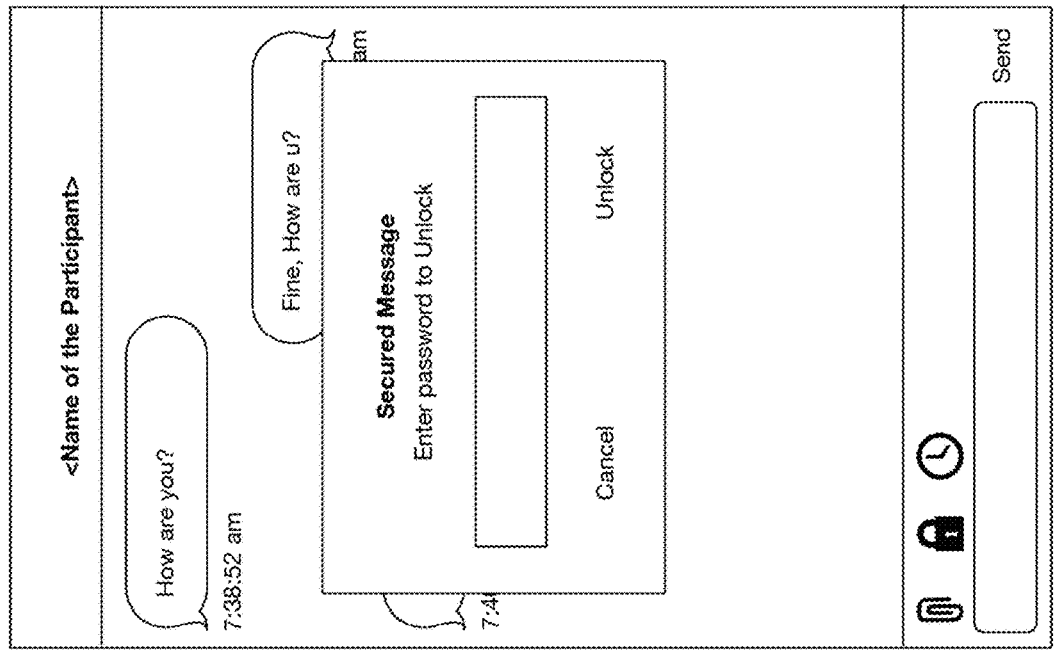
FIGS. 1a and 1b are screenshots of a user interface of the present inventive system illustrating entry of a passcode by participants on their digital communication devices in accordance with a preferred embodiment of the present inventive system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, tools, techniques and methods are omitted so as not to obscure the description of the present inventive system. It should be expressly understood that the drawings are included for illustrative purposes and do not represent the scope of the present inventive system. In the accompanying drawings, like reference numbers in different drawings may designate similar elements.

The communication applications like e-mail, chat/texting, social interaction applications like facebook and twitter communicate digital content including text messages and/or files that may be sent as attachments to the text messages or sent unaccompanied by text. The digital content is communicated between the digital communication devices of two or more participants or users of the communication applications. A running conversation in such communication applications includes a thread of the exchanged digital content. i.e., messages with or without attachments. The thread is shared by the participants who may be senders and/or receivers of the content and displayed on their digital communication devices.

The present inventive system that achieves the objects set above is described and explained in detail below. It will be readily apparent to these skilled in the art that the discussed details are applicable to all communication applications, programs, systems, services utilized by the participants for sharing content using devices via the networks discussed above. Also, throughout this document digital content will be referred to simply as "content" and digital communication devices will be referred to simply as "devices".

The functionality of the present inventive system enables its users or participants to designate any of the content shared or communicated between the participants' devices as confidential. This functionality can be added into any of the communication applications, e.g., these discussed above, for example as a plug-in to the code of these applications. The content designated as confidential is then sent by one of the participants, i.e., a sender, and received by designated one or more participants, i.e., receivers. However, the received content designated as confidential is not displayed on the receiver's device. Instead, a sign is displayed in its stead indicating that confidential content is received and may be viewed upon presenting of valid credentials. As will be explained further below, the receiver of the content needs to be authenticated by providing a passcode.

For example, where there are two conversation participants, sender A and receiver B, sender A may want to keep certain content, i.e., messages and/or attachments in confidence with receiver B. The reason for this may be to prevent unauthorized persons from intentionally or inadvertently viewing the communicated confidential content on receiver B's device when, e.g., receiver B's device is left unattended, is lost or stolen, or when an unauthorized person is staring over receiver B's shoulder or otherwise peering into receiver B's device's screen. However, in accordance with the present inventive system described herein, viewing of the content designated as confidential requires authentication as described herein, thus, only authenticated authorized participants will be enabled to view the content designated as confidential. Thus, in this example, receiver B is enabled to view the received confidential content in private, but only after being identified by the present inventive system as a valid authorized participant.

Additionally, in the running conversations between more than two participants, the sender may prefer to share the content with some, not all receivers. For example, sender A may decide to distinguish between participants B, C, and D having different security clearances, such that participant D has a lower security clearance than the rest of the participants. Thus, to share confidential content only with authorized participants (these with the higher security clearance, i.e., B and C) sender A will set security clearance for the confidential content to a level at which receivers B and C but not receiver D will be able to view the content.

Further, the senders can group contact information of the participants in a manner that participants in one group but not the others can view the confidential content. For example, sender A may designate participants B and C as members of group (i) and receivers C and D as members of group (ii). Then when sender A sends the confidential content to group (i) participant D is prevented from viewing thus sent confidential content; and when sender A sends confidential content to group (ii) participant B is prevented from viewing thus sent confidential content. The confidential content will be revealed only to the designated authenticated participants and concealed from others.

As discussed above, the content may include text and have attached digital files. The attached digital files may comprise text, spreadsheets, power point presentations, multimedia, i.e., pictures, music, video, and their combinations, etc. The whole or any part of the content may be designated as confidential. For example, the text message maybe designated as confidential but not the attachments and vice versa, i.e., the attachments maybe designated as confidential but not the message.

Moreover, the digital files comprise elements that may be selectively, individually or grouped, designated as confidential. The elements of the digital files may include the following:

1. For text based files produced, without limitation, by word processing programs, applications, and online services, such as Notepad, Wordpad, Microsoft Office suite, EditPlus, Keynote, Numbers, Pages, Notes, Open Office, Adobe Acrobat, etc. Elements of text based files, for example, comprise words, sentences, paragraphs, chapters, pages, and other similar separator sections. Any of these elements can be selectively designated as confidential.
2. For spreadsheet files, produced, without limitation, by, e.g., Microsoft Excel and similar programs and services. Elements of spreadsheet files, for example, comprise specific cells, formulas, worksheets, rows, columns and etc. The spreadsheet files as a whole and/or any of these elements can be selectively designated as confidential.
3. For multimedia based files including images, video, music or portions, there of. The image based files may include all image formats as for example defined by png, jpg, jpeg, Tiff, bmp, gif, and other image formats extensions. The video based files may include all image formats as for example defined by avi, dat, mov, MP4, mpeg, fly and other video formats. The elements of the multimedia based files are film frames, collection of image pixels that may be identified by in a coordinate system, and the like. As with other types of files discussed, the multimedia based files individually as a whole and/or any of their elements can be selectively designated as confidential. Of course, the multimedia based files can be included within the text based files and designated as confidential individually or as part of the file. Some of the programs that can create such mixed type files include Microsoft Office, iWorks, Open Office, etc. Also chat, email, and Instant Messengers can easily manage sharing of mixed type files.

Passcode

The participants may be required to register for participation in the present inventive system. This registration may require selection of a valid login/password combination, or an alternative, before the system can be used. In other words unless the participants login into the system using a valid login/password combination the features described below will not be made available to them. Alternatively, the use of the entire system may be prohibited. Thus, the use of the login feature for the present inventive system may be optionally switched ON and OFF. Various methods of registering and authenticating the login/passcode combinations are familiar to these skilled in the art.

Figure 1A:
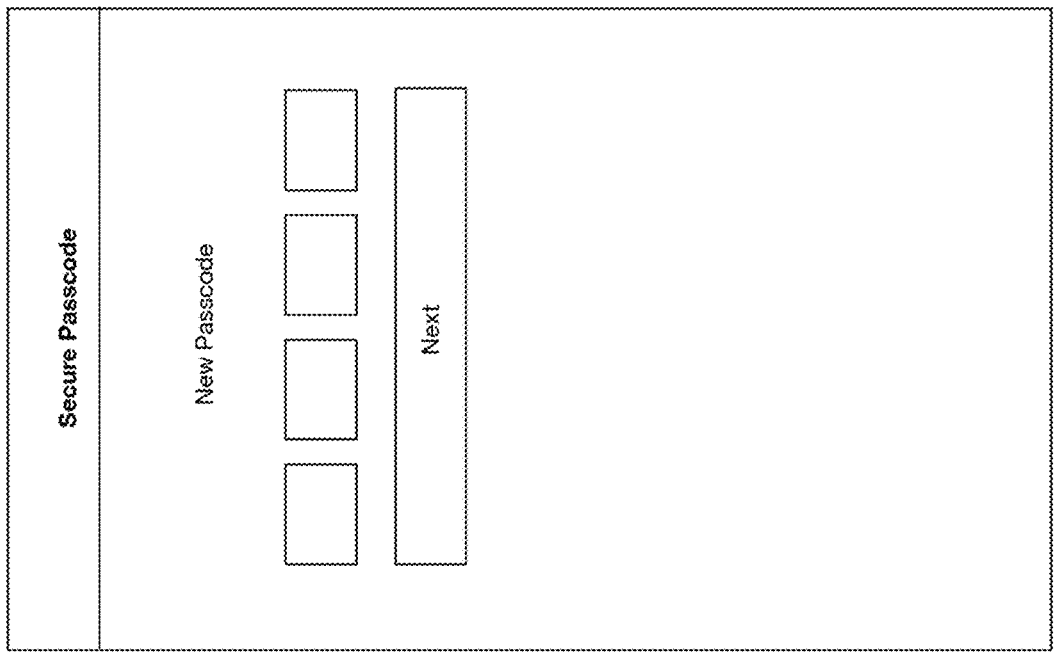

Separate from the login/password authentication the participants are asked to establish a passcode uniquely identifying the participant. In an alternative embodiment, different passcodes may be established to uniquely identifying different devices used by one participant. FIG. 1a illustrates an example of a graphical user interface (GUI) for accepting the passcode. The passcode can be a combination of keyboard characters, iris or fingerprint scan, a geometric shape or any similar unique code. Upon authentication, the passcode allows the participants to execute the features of the present inventive system to designate the content on the participant's device as confidential and to view the content designated as confidential that resides on the participant's device. While in the preferred embodiment the participants are not required to have an authenticated passcode to designate the content as confidential. An alternative embodiment may require passcode authentication prior to designating the content as confidential. However, it is important that the passcode is authenticated prior to view the content designated confidential.

Once the content designated as confidential is shared, i.e., sent or communicated, all participants will receive it on their devices. However, only the participants with the authenticated passcode will be able to view it. FIG. 1b illustrates an example of a GUI prompting the participants attempting to designate or view the confidential content to authenticate their passcodes. Alternatively, a visual indication or a sound alert may be given to remind the participant to enter the passcode. Also temporary passcodes may be assigned to select participants, e.g., as a promotion, to enable sharing and viewing of confidential content for a limited time or limited number of times.

Figure 2:
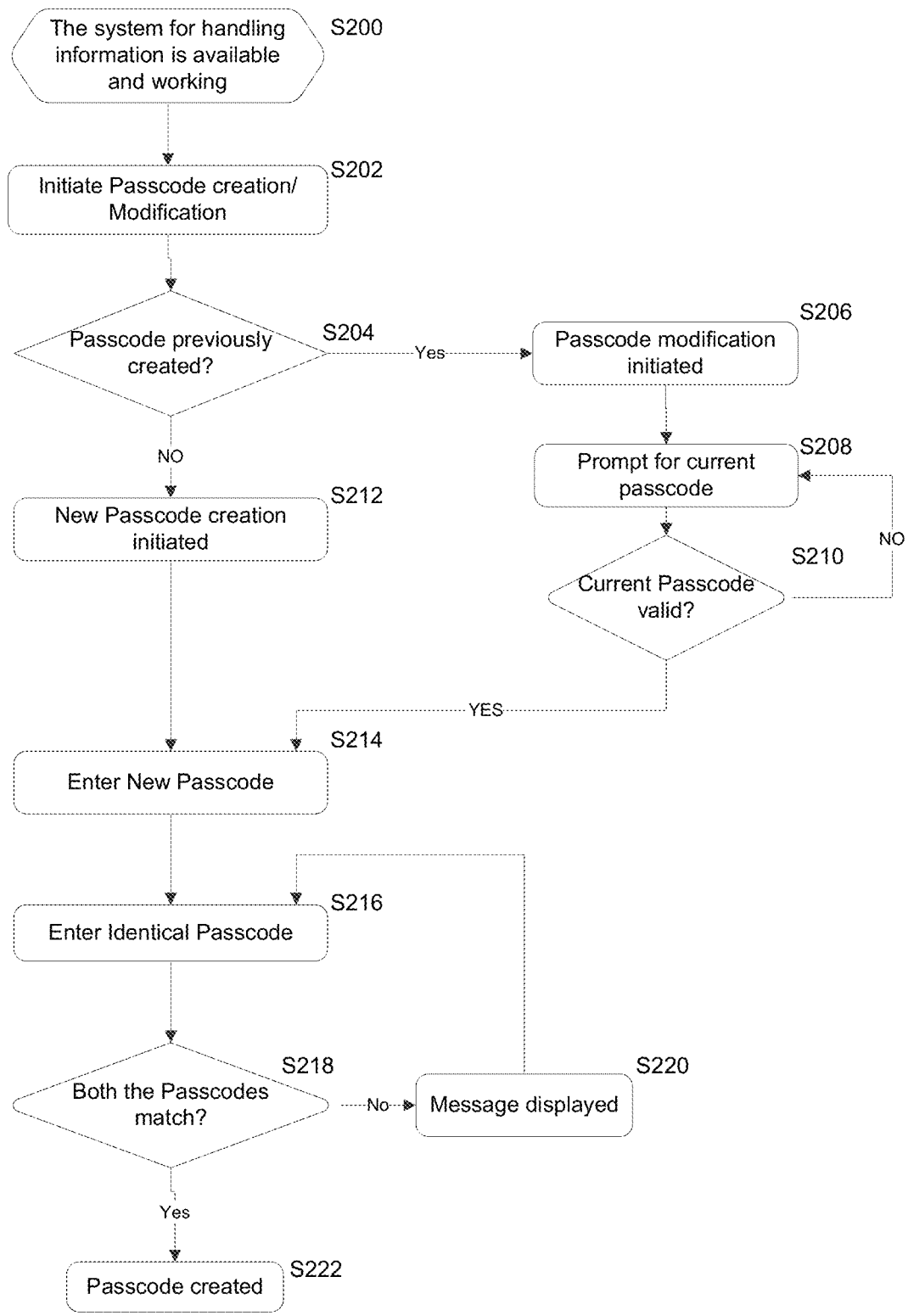
FIG. 2 is a flowchart illustrating creation and/or entry of the passcode by the participants on their digital communication devices in accordance with the preferred embodiment of the present inventive system.

One example of authenticating the passcode is illustrated in FIG. 2. As shown, in step S200 it is ascertained that the present inventive system is available. In step S202 a GUI screen, e.g., FIG. 1a, is displayed, initiating a dialogue with a participant. At step S204 it is determined if the passcode already exists, if the passcode exists, the passcode is then modified if at step S206 it is determined that modification is required. After the passcode is entered as requested at step S208, it is validated in step S210. If the passcode is valid the processing continues in step S214. Alternatively, if at step 204 it was determined that the participant does not have a valid passcode, a new unique passcode is created in step S212. The passcode is entered when requested at step S214 and re-entered at step S216. Step S218 matches entries at steps S214 and 216, the passcode is approved in step S222, otherwise step S220 indicates that the entries do not match and entry/re-entry of the passcode back at steps S214/S216 is repeated.

Secure Sharing

Figure 3B:
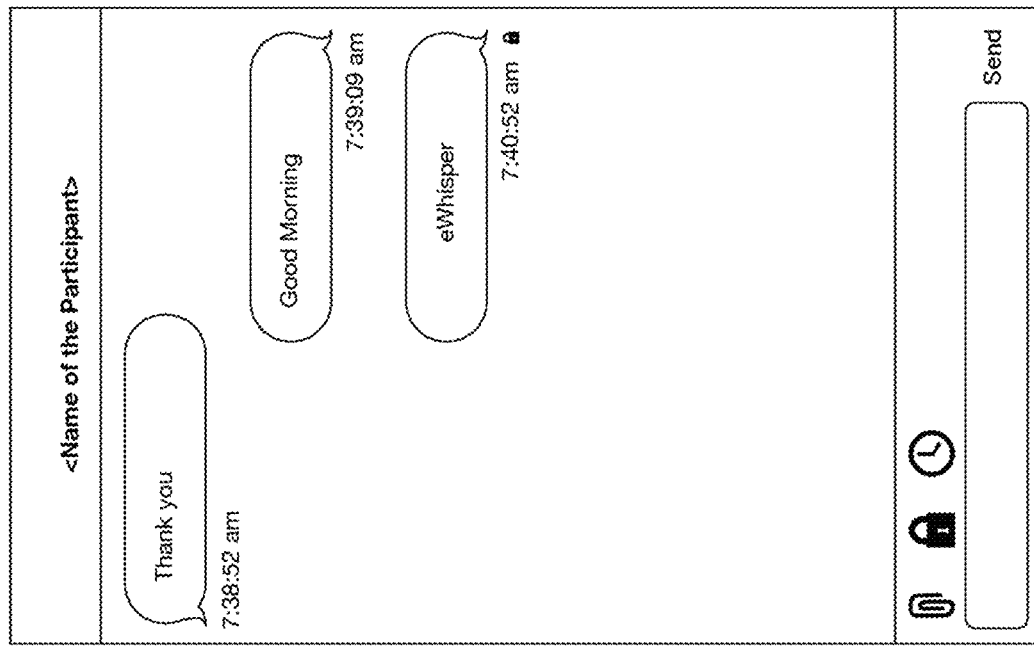
FIGS. 3a and 3b are screenshots of a user interface of the present inventive system illustrating creation of digital content by participants on their digital communication devices and securing or hiding of the content in accordance with the preferred embodiment of the present inventive system.
Figure 3A:
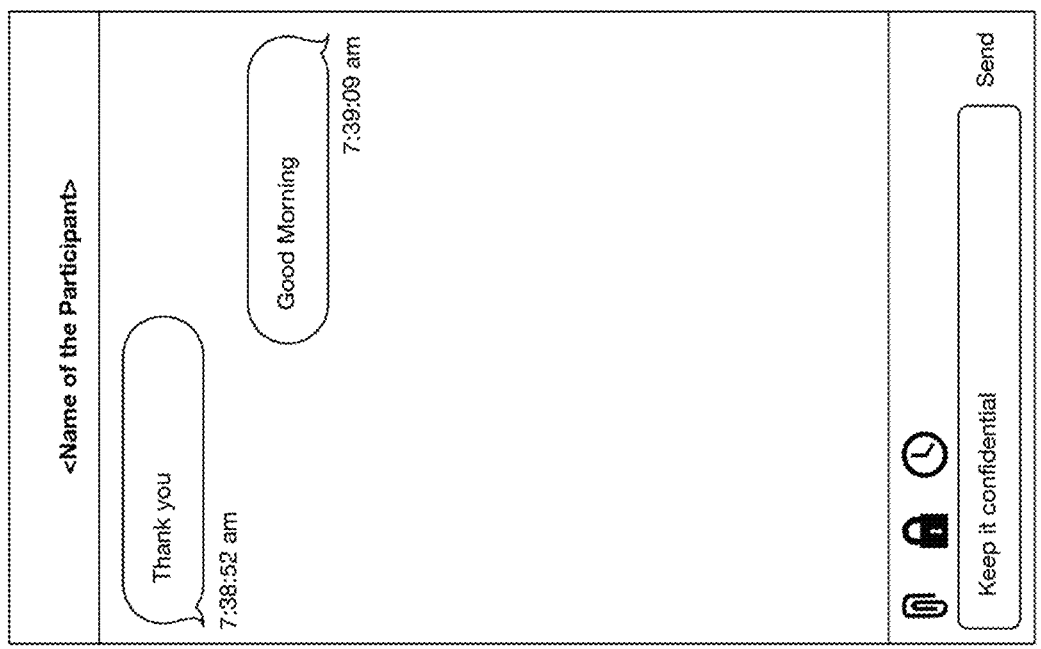

FIG. 3a illustrates a GUI displaying a confidentiality icon depicted as a lock. Appearance of the icon may be affected by authentication of the passcode since it enables the confidentiality feature for the authenticated participant. A confidentiality icon may appear on the screen or if already present be bolded to indicate that it is enabled (by passcode authentication) and is active. The location of the confidentiality icon is selected so as to be easily and conveniently accessed when a new message is typed and/or when an existing content is selected for sharing. It will be readily recognized that the confidentiality icon may be identified by different images, may be placed at different locations in the GUI and that alternative to the icon may be used.

As further shown in FIG. 3a, new content is created in a form of a sentence "Keep it confidential" typed into a message box in the GUI. To designate the new content, i.e., the sentence "Keep it confidential" as confidential, the confidentiality icon, i.e., the lock, is selected, e.g., by pressing or touching. It is apparent that the new content can be designated as confidential before and/or after the message is typed, and the confidential designation may be given to any message that is typed until an indication that this is no longer required is received, i.e., until the setting is removed, as for example pressing the confidentiality icon again, twice, or holding it down for a preset period. Also, instead of using the icon, a flag maybe turned set and re-set by going into the settings of the present inventive system to designate the content as confidential and to remove the setting.

Once the new content is created and designated as confidential, it can be shared with designated receivers by, for example, selecting or touching the word "send" located next to the text box. The manner of creation and sending of the content is known to these skilled in the art from e-mail, chat, and word processing applications.

Referring now to FIG. 3b, the content, "Keep it confidential" is received on the receiver's device, however, because it is designated as confidential by the sender, it is not immediately viewable on the receiver's device. Instead of the words "Keep it confidential" appearing, a new bubble including an indication: "eWhisper". This or some other selectable message, alerts or indications to the receiver that the received content is designated as confidential by the sender. For example, as illustrated in FIG. 3b a graphical indication may be used, e.g., an image of the lock under the bubble in which the words "eWhisper" appear.

To see the hidden contents of the received message, the receiver will need to select, touch the "eWhisper" bubble. If the receiver has already authenticated the passcode the message "Keep it confidential" will be displayed in the bubble instead of "eWhisper" after being touched or selected by the receiver. Also as discussed above, if the receiver has not authenticated its passcode, after touching or selecting the bubble reading "eWhisper" the receiver is prompted to provide the passcode, as shown in the example of FIG. 1b.

Figure 4:
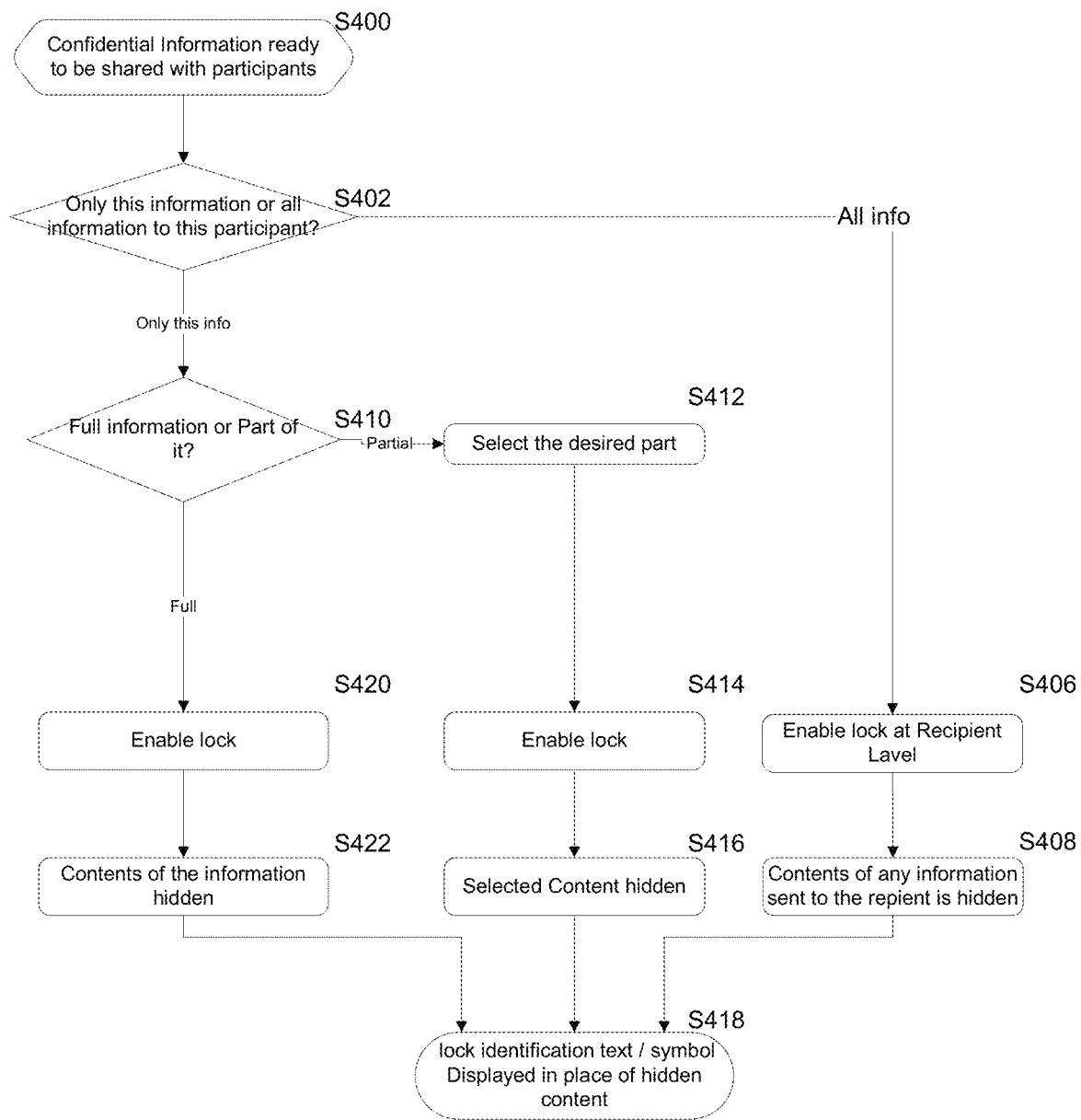
FIG. 4 is a flowchart illustrating creation and/or selection of digital content, designation of all or parts of the digital content as confidential, and displaying of the digital content designated as confidential by the participants on their digital communication devices in accordance with the preferred embodiment of the present inventive system.

One example of designating the digital content as confidential using the passcode is illustrated in FIG. 4. As shown, in step S400 it is ascertained that new content is created or existing content is selected. In step S402 the participant is asked how many and/or what specific elements of the information should be secured as confidential. If, the participant indicates that all content to follow is to be designated as confidential, then a "receiver level" lock (a flag) is set and enabled at step S406. At step S408 the present inventive system enables further sharing of all content to be confidential or hidden. Finally at step S418 the text, e.g., "eWhisper" is displayed alone or in conjunction with the graphical lock indication as shown in FIG. 3b, to indicate that the content is confidential and therefore is hidden.

If at step S402, the participant indicates that only the current content is to be designated as confidential, then at step S410 the participant is asked if all or part of the current content should be made confidential. If the answer is only a part, the participant is enabled at step S412 to select the desired part (see, element as discussed above). At step S414 the lock is enabled and the selected content is designated confidential, i.e., hidden in step S416. As discussed above, at step S418 the text, e.g., "eWhisper" and/or the graphical indication as in FIG. 3b, is displayed to indicate that a portion of the content is confidential and therefore is hidden.

However, if at step S410 the participant answers that all of the content is to be confidential, the lock is enabled at step S420 and the content is designated confidential, i.e., hidden in step S422. As discussed above, at step S418 the text, e.g., "eWhisper" and/or the graphical lock indication, as in FIG. 3b, are displayed to indicate that a portion of the content is confidential and therefore is hidden.

Figure 5:
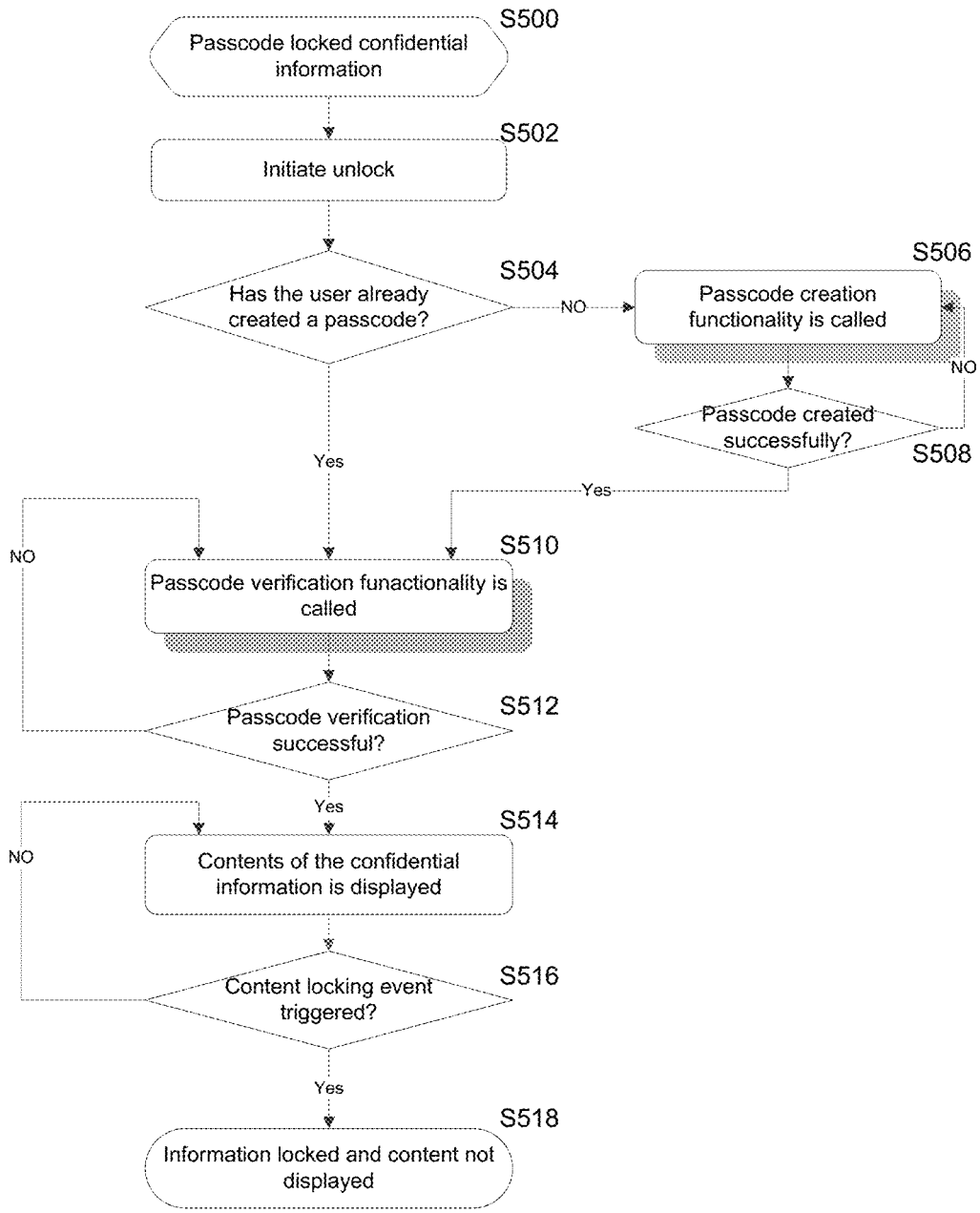
FIG. 5 is a flowchart illustrating selection and displaying of the digital content designated as confidential by the participants on their digital communication devices in accordance with the preferred embodiment of the present inventive system.

One example of a participant (sender and/or receiver), using the passcode for displaying the digital content that was secured as confidential and shared, i.e., communicated is illustrated in FIG. 5. As shown, it is first ascertained in step S500 that content is secured or in other words locked for viewing. In step S502 the unlocking sequence is initiated by determining, in step S504, if the participant has already created the passcode. If the passcode was entered, the processing proceeds to step S510. Otherwise step S506 leads the participant through the passcode authentication process discussed above with reference to FIG. 2. In step S508 it is verified that the passcode is now created/entered.

After, in steps S510 and S512, the passcode is verified, i.e., the receiver may be asked to re-enter the passcode if any discrepancy is discovered, the secured content is displayed in step S514. After displaying the content, if at step S516 it is ascertained that the participant has triggered the locking functionality, the content is locked again in step S518.

Figure 6B:
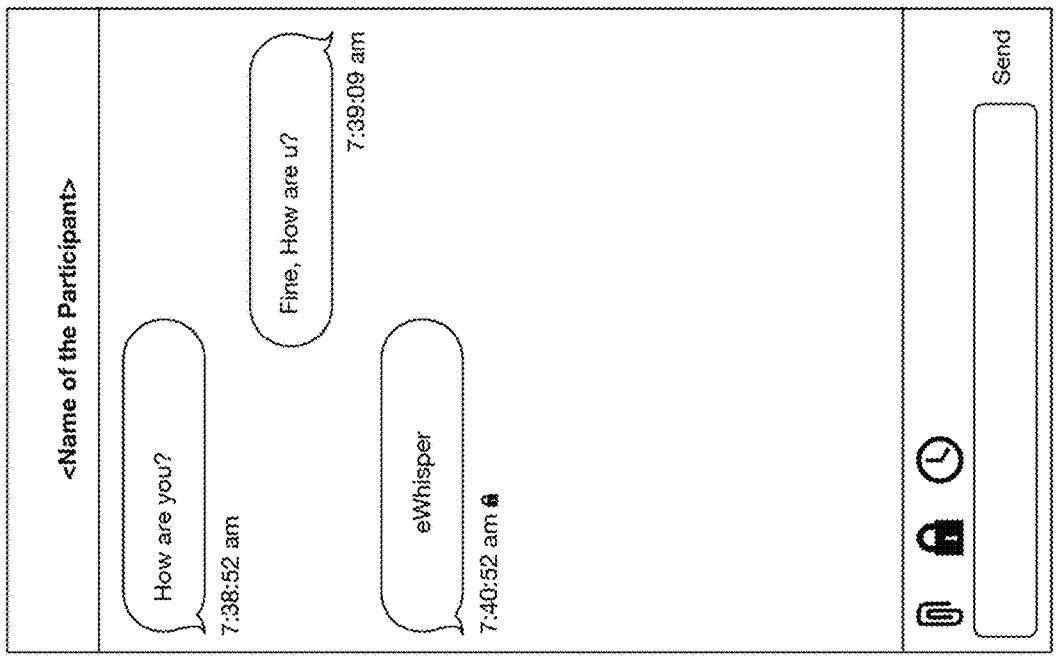
FIGS. 6a and 6b are screenshots of a user interface of the present inventive system illustrating selection of existing digital content by participants on their digital communication devices and securing or hiding of the content in accordance with the preferred embodiment of the present inventive system.
Figure 6A:
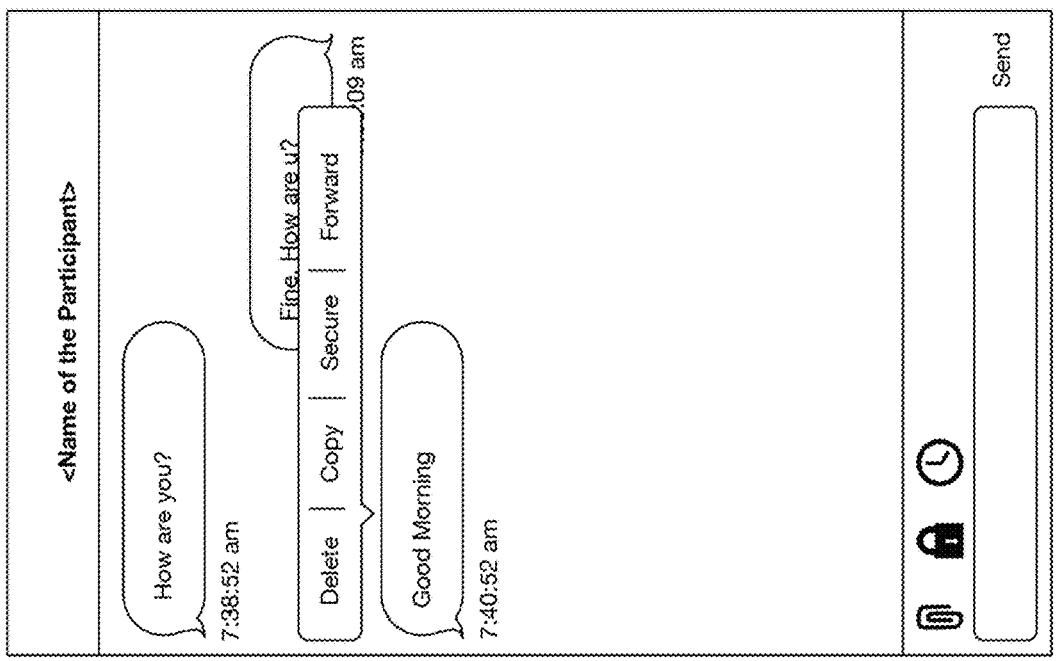

It is noted that for sharing, any content (see, discussion of the content above) newly created, downloaded or pre-existing on the participants' devices can be designated as confidential. An example of this is illustrated in FIGS. 6a and 6b, where one of the pre-existing messages reading "Good Morning" is selected for confidential sharing. In the example, the participant selects or touches the message and is presented with actionable options, e.g., delete; copy; secure; and forward (FIG. 6a). While other options may be familiar to these skilled in the art, by selecting the "secure" option the participant designates the message "Good Morning" to be confidential. In response to this designation, as shown in FIG. 6b, the message "Good Morning" is no longer viewable and is replaced by an indication, i.e., "eWhisper" that this particular content is confidential and requires additional action for viewing.

In situations where the sender's passcode is authenticated but the receiver's is not, sharing of the confidential content with the unauthenticated receiver may be prevented. Alternatively, the confidential content may be shared anyway since it will not be possible for unauthorized receivers to view the confidential content. Also, once the receiver realizes that the passcode is required to read the shared confidential content, that participant will request authentication as described with reference to FIGS. 1a and 1b.

It is noted that the present inventive system may send the actual confidential content to the receiver's device in anticipation that the shared confidential content will be opened and viewed. However, alternatively, instead of the actual content only an indication of the shared confidential content, e.g., the indication "eWhisper" as in FIG. 6a, can be sent. The actual confidential message can be sent only when the receiver attempts to open and view the shared content.

It will readily appreciated by these skilled in the art that the present inventive system discussed herein is easily adaptable to function with all content sharing and communication applications, e.g., e-mail and chat applications, all social network applications, and etc. Any differences found in implementation of these applications do not affect the features discussed in this document.

Retention

To further secure sharing of the content, regardless of weather the shared content is designated as confidential, i.e., secured as discussed above, the following is achieve by the present inventive system. The sender may mark the shared content, e.g., by setting a flag, to indicate that other participants are not to further share the shared content. This will prevent the receivers from copying or forwarding the confidential messages to additional participants. Alternatively, as discussed in examples above, sharing may be allowed with receivers specified by designation or by groups.

Furthermore, removing the content from the devices, e.g., running thread in a messaging conversation will make it less likely that such content will be viewed by unauthorized persons. Accordingly, duration of retention of the shared content on the receivers' devices and in on-line databases, e.g., on the e-mail servers, that may store the shared content, may be limited. FIGS. 1b, 3a, 3b, 6a and 6b illustrate an icon depicted as a clock. The sender selects this icon to choose a specific duration for the shared content to remain on the receiver's device after it is received and before it is deletes/ removed. It is noted that the location of the clock icon is selected so as to be easily and conveniently accessed when the duration of a newly created or existing content is defined. It will be readily recognized that different icons, locations and designations may be used.

Figure 7B:
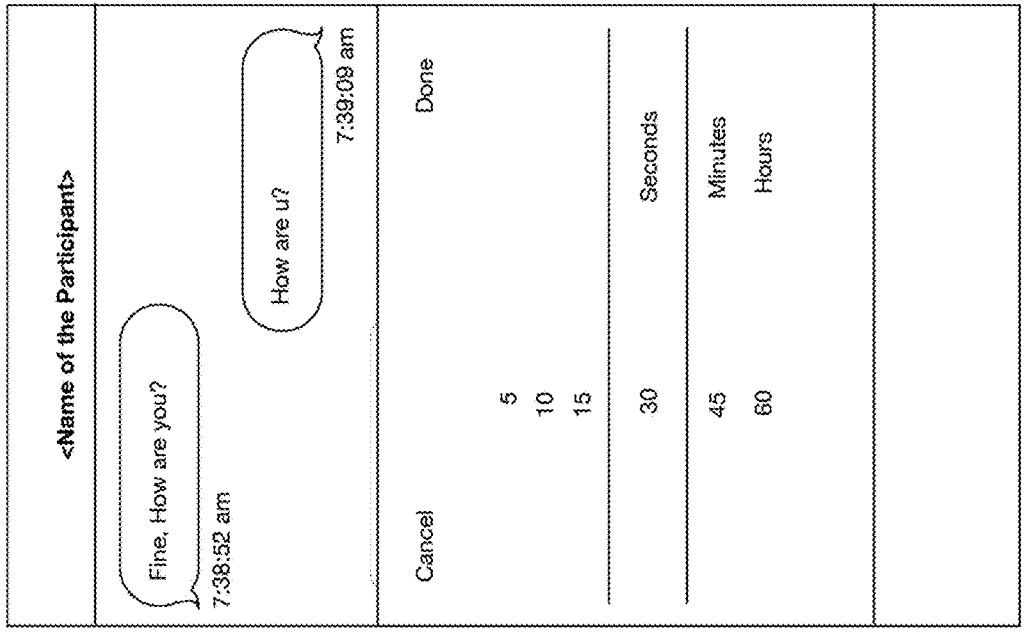
FIGS. 7a and 7b are screenshots of a user interface of the present inventive system illustrating setting retention limits on shared digital content by the participants on their digital communication devices in accordance with as realized in the preferred embodiment of the present inventive system.
Figure 7A:
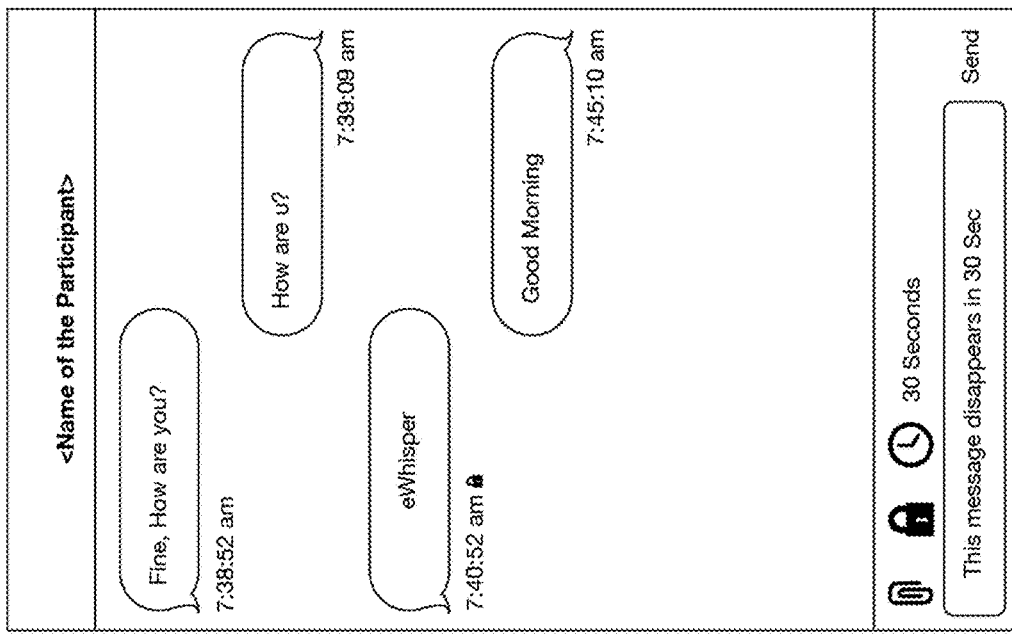

As shown in FIG. 7a, the new content is typed into the text window: "This message disappears in 30 secs". By pressing or touching the clock icon time maybe selected from a drop down menu or typed in. Other manners of providing values, for example, using a page of time values shown in FIG. 7b may also be used. As indicated in FIG. 7b, the duration time may be set in seconds, minutes, hours, or days. Alternatively, a number of times that the message is viewed maybe used to determine when the shared content is deleted.

Figure 8:
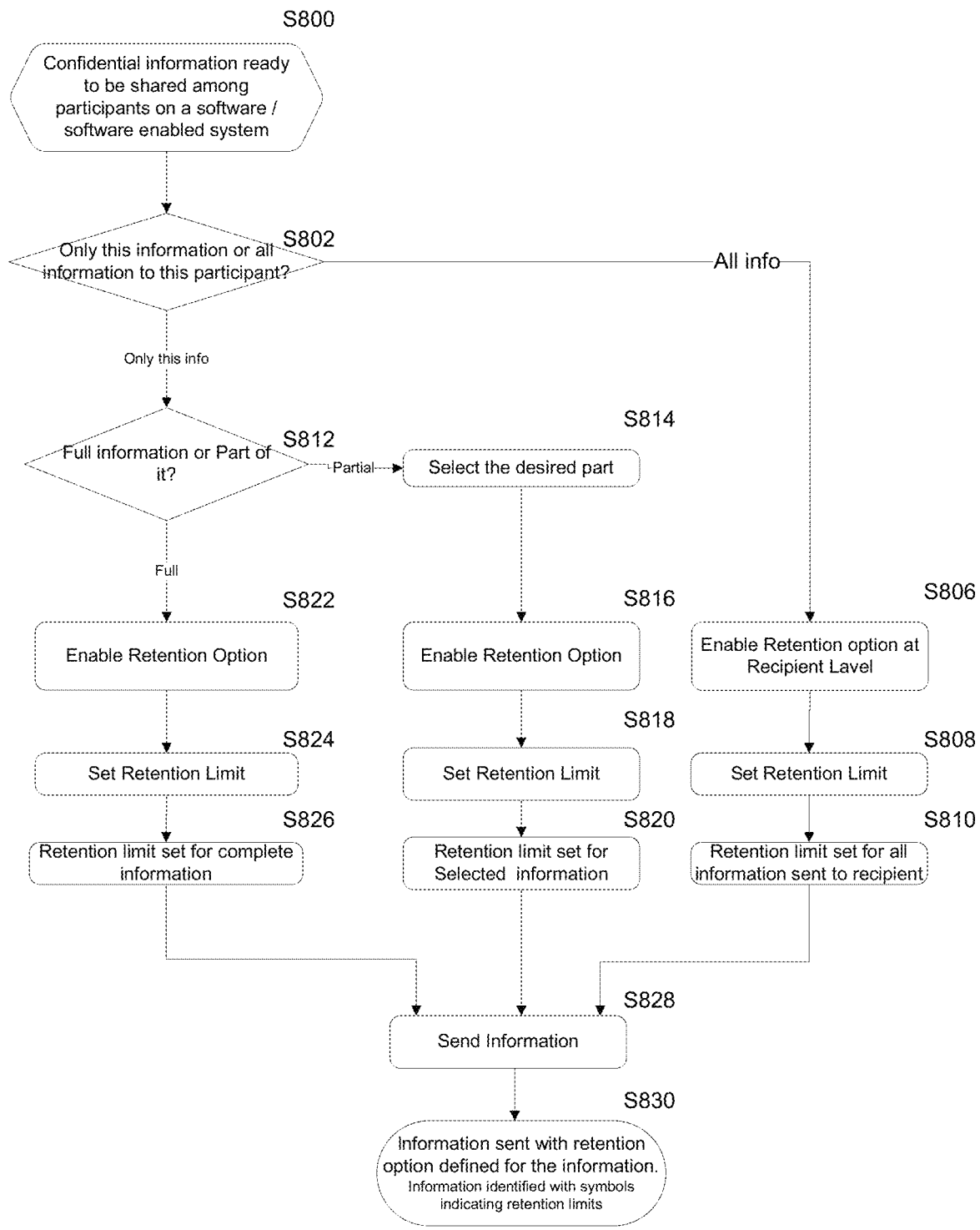
FIG. 8 is a flowchart illustrating setting retention limits on selected digital content by the participants on their digital communication devices in accordance with the preferred embodiment of the present inventive system.

One example of a retention control of shared confidential digital content is illustrated in FIG. 8. As shown, in step S800 it is ascertained what content is ready to be shared. In step S802 the participant is asked to indicate whether only the current content or all current and future content designated to be shared with a particular receiver is to be given a retention limit. If the participant (sender or receiver) indicates that all current and future content is to be given the same retention limit, a retention limit is enabled at a receiver level of the present inventive system at steps S804 and S806.

If the participant (sender or receiver) indicates that only the current but not the future content is to be given the retention limit, a retention limit is enabled at a sharing level of the present inventive system at step S806 the participant is asked if the retention limit should be set for all or only a part of the current content. At step S814 the participant selects the part of the content for which the retention limit is to be set.

Retention processing is then enabled at steps S822, S816 and S806 and retention limit is set at steps S826, S820 and S810, respectively. After which the content is shared with the other participants. As shown in step S830, the shared content is marked with indications of retention limit. Thus, on the receivers' devices the shared content will be deleted when the present inventive system detects that the retention level is reached.

The present inventive system can also designate the duration to be "delete after read" (or delete after viewed or heard in case of video and audio content). This specifies that the shared content must be removed from the receivers' devices once it is determined that the receiver has viewed or read the shared content. Alternatively, a number of views (reads) may be set, to indicate how many times the shared content may be viewed before it is deleted. For example, "delete after read twice". Similar to the discussion above, with regard to duration of the shared content, which is removed or deleted from the receiver's device upon expiration of the established duration, when the "delete after read" is set, the shared content is deleted once it is determined that the shared content was viewed.

When the duration the confidentiality of the content are set together, i.e., the message is typed, the lock icon is pressed, then the clock icon is pressed and the duration time or "delete after reading" is set. The content is thus made confidential and will be deleted from the receivers' devices after it is shared and the condition of duration expires. Thus, when the duration condition is met, i.e., the time elapses or the timer value is reached, the shared content is removed and disappears from the receiver's device without leaving any trace. It is worth noting that for the sharing of confidential content, the count down of the duration time may be selected to start from when the confidential content is received on the device or when it is unlocked by the receiver. Conversely, since the "Delete After Read" setting is not based on time, the determination of when the shared content is read may be, for example, determined by monitoring the receiver's use of the respective device, e.g., screen navigation or uses of other applications.

Figure 9:
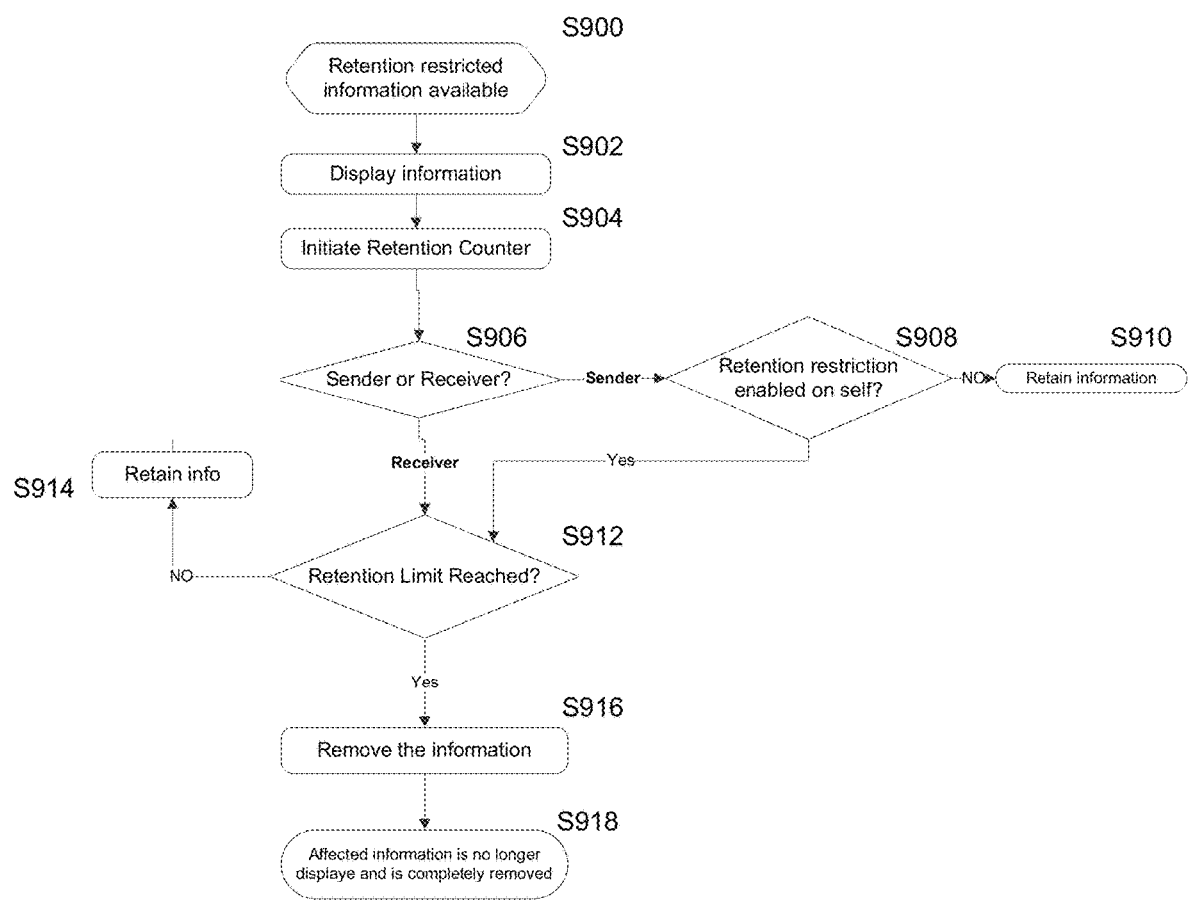
FIG. 9 is a flowchart illustrating deletion or whipping out of the digital content from the participant's digital communication devices in response to the retention limits pre-set by the participants being reached in accordance with the preferred embodiment of the present inventive system.
Figure 10B:
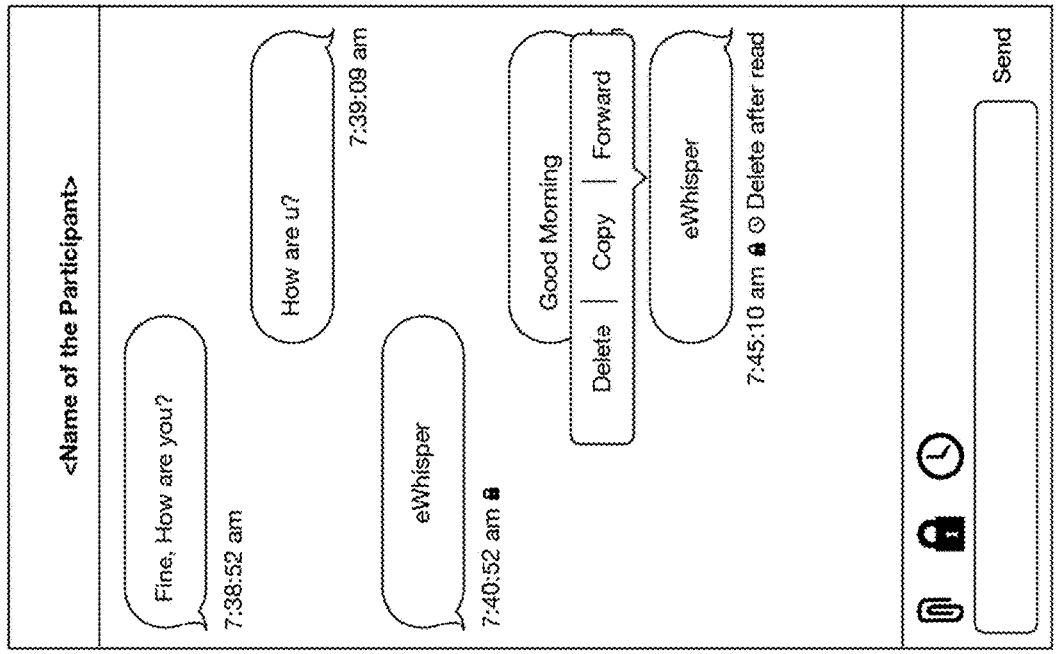
FIGS. 10a and 10b are screenshots of a user interface of the present inventive system illustrating indications of set retention limits on shared digital content in accordance with as realized in the preferred embodiment of the present inventive system.
Figure 10A:
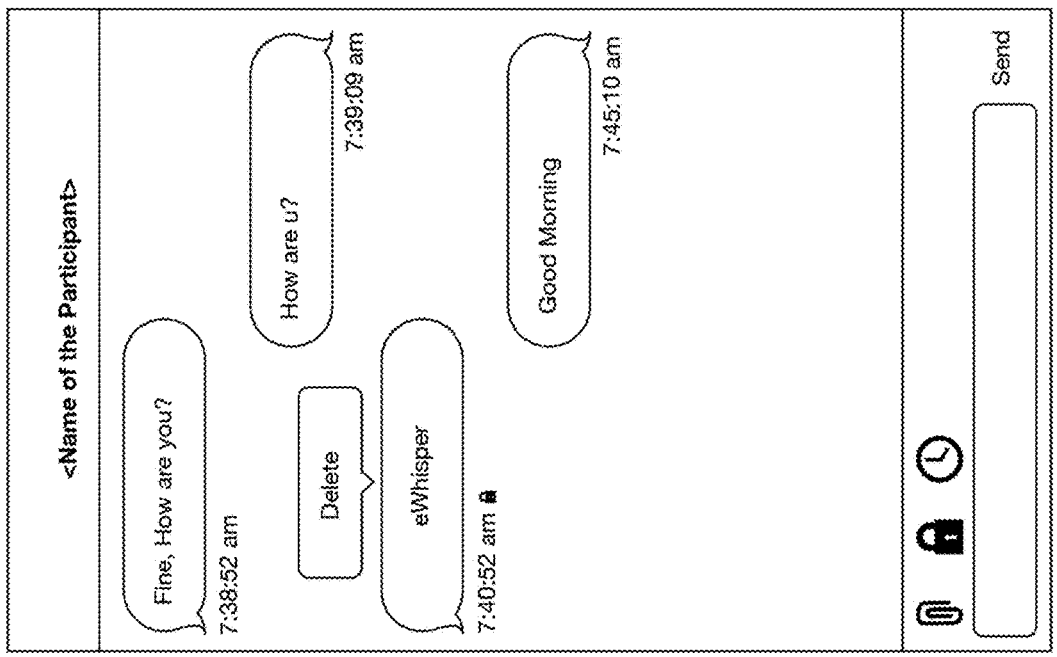
Figure 11:
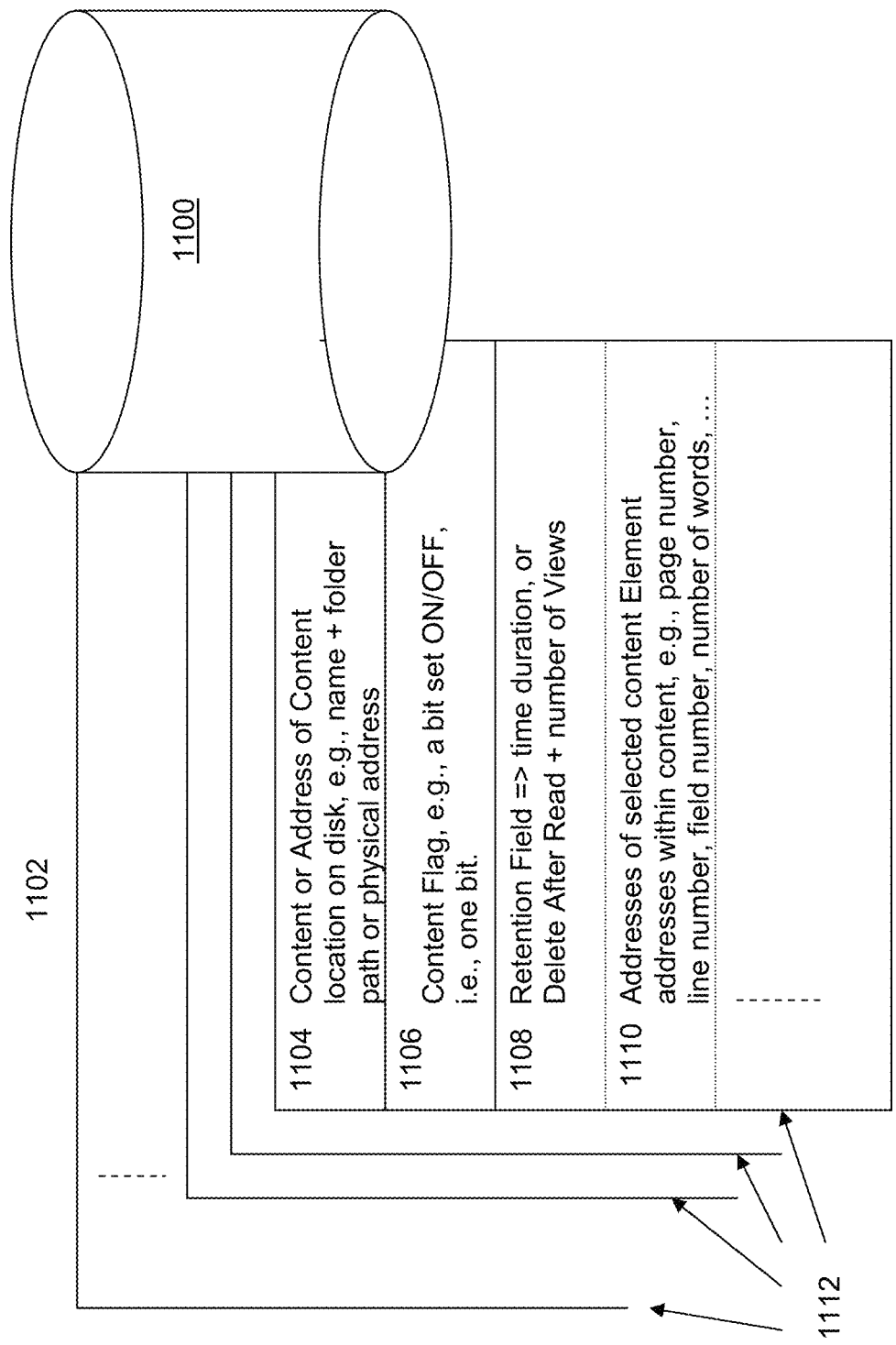
FIG. 11 is a diagram illustrating a database table that keeps track of selection of digital content, designation of all or parts of the digital content as confidential, setting duration of retention and enabling and/or preventing displaying of the digital content designated as confidential by the participants on their digital communication devices in accordance with the preferred embodiment of the present inventive system.

One example of how retention control of shared confidential digital content may be implemented is illustrated in FIG. 9. As shown, in step S900 it is ascertained if any retention control is available. In step S902 the retention information is displayed. Examples of this are shown in FIGS. 10a and 10b where an image of the clock and text "30 Sec" are display beneath the bubble of content reading: "This message disappears in 30 secs" and where an image of the clock and text "Delete After Read" are display beneath the bubble of content reading: "This message is deleted after it is read". In FIG. 10b the last message was designated confidential and, thus, is hidden. Instead "eWhisper" is written inside the bubble and an image of the lock is displayed with the image of the clock and the text "Delete After Read" beneath the bubble.

Returning to FIG. 9, at step 904 a retention counter is initialized for the specific content, while at step S906 it is determined whether the participant, the user of the current digital communication device is the sender or receiver of the retention restricted content. The function is terminated at step S910 if at step S908 it is established that the participant is the sender who set the restriction. Further, if the retention restriction limit was reached as determined in step S912 the content is removed from the display in step S916 and completely wiped off the digital communication device in step S918. Otherwise the content is retained in step S914 and step S912 continues to monitor is the restriction limit is reached.

In one exemplary embodiment, the above described inventive system may achieve its goals as follows. A database 1100 may be provided in which the content residing on the device is referenced, e.g., by address on disc, name and folder name, and etc., in field 1104. All content that is sent or received on the participants' device is registered with the database 1100. If a size of the content is small, e.g., an SMS message, the whole content may be stored on the database 1100 in the field 1104. The tables 1102 in the database 1100 may be set up to include additional fields associated with the content referenced in the field 1104. These fields may include a confidentiality flag 1106 indicating that the content is confidential, and a retention byte or word 1108 indicating the duration of the content before it is deleted. When, as discussed above with reference to at least FIGS. 4 and 5 the content is selected and the lock icon is pressed to designate the content as confidential, this action triggers the system to set the confidentiality flag 1106 for indicating that the content referenced in the field 1104 is designated confidential and to be hidden from view.

Sharing of the content among the participants, also shares its associated properties, the above discussed fields, in the tables 1102. When received on the participants' devices the content and its associated properties are stored on the local database in the tables 1102. Unlocking of the content is achieved when the flag 1106 in a record 1112 uniquely associated with the selected content is set or re-set in response to the participant, here the receiver because shared or communicated content is being discussed, providing an authenticated passcode. See discussion above relating to passcode.

Actions that can be perform and affect the shared/communicated content, e.g., forwarding, copying, deleting, may be allowed or prohibited based on the state of the flag 1106 in the local database 1100. For example, if the flag 1106 is set, the participant is prohibited from forwarding the content. Of course additional field in the tables 1102 may be provided specifically for dealing with these and other actions affecting the content.

The inventive system consults the tables 1102 on the participant's device any time an operation is performed on the content, as for example when the content is displayed. After checking if the confidential flag 1106 in the record 1112 uniquely associated with the content is set, the system will, display the content if the confidential flag 1106 is in a re-set state or not display the content, instead displaying an indication, e.g., "eWhisper" (see FIG. 3b) if the confidential flag 1106 is set. Entering of the authenticated passcode temporarily resets the confidential flag 1106 to its re-set state indicating to the system that the content can be displayed but then, after display the confidential flag 1106 is set again for preventing future unauthorized viewing. The flag 1106 is reset temporarily so as to hide the content after the viewing. The participant may opt to unlock the content permanently.

The retention feature of the inventive system, discussed above with reference to FIGS. 8 and 9, may be achieved in a similar way. Individual tables 1102 of the database 1100 may further include a field 1108 in the record 1112 uniquely associated with the content. The time duration or an indication of delete after read provided by the participants, as discussed with reference to FIGS. 7a, 7b, 8 and 9, is entered in the field 1108. As discussed, when the content is shared among the participants, the relevant properties of the tables 1102 along with the time and other information in the retention field 1108 are shared with along with the content. It is noted that as the timer is run down or increased, the retention field 1108 in the database 1100 is updated. The running totals of the time remaining are then displayed to the participants.

Further, the tables 1102 may include a field 1110 for listing indicators or identifiers of elements in the content files. These elements are discussed above and may be addressed, for example by page, line, chapter, word numbers, etc. Also HTML, XML, and similar language codes can be addressed and stored in the tables 1102.

As indicated, a record 1112 is established for each of the shared content so as to uniquely associate with a respective shared content, whether designated as confidential and/or designated to have a retention restriction, sent or received on the devices. Therefore, when the content is deleted from the device, its associated record 1112 is also deleted from the table 1102 in the database 1100.

It is foreseen that applying the present inventive system described above with reference to the Figures to content sharing applications in various industries will help prevent unauthorized viewing. For example, such industries may include banking. Many banks have migrated their monthly reporting to the clients and customers to paperless statements, i.e., receiving monthly statements in digital form instead of printed on paper. Such statements and other banks' digital communication include credit card/debit card account information and other bank account statement details. Thus, communicating (sharing) of the digital statements in the form of secure confidential content discussed above will ensure secrecy and assure the customer that the account information is shared safely and confidentially.

Further, for banks and any institution or company that requires their clients or customers to use login/password combinations, sharing or communicating this information digitally can now be secured in accordance with the present inventive system. Thus, for companies who used to send "pin" information by snail mail, i.e., debit card pin codes, are now able to share this content digitally.

In accordance with the present inventive system Individuals, groups, and organizations will benefit from the ability to share sensitive confidential content, for example, Board of Directors meetings outlining revenues, sensitive ongoing and future projects, as well as secret or sensitive partnerships and/or acquisitions; sales figures, planed sales targets, sales proposal, quotes; marketing methods and budgets. Also, the medical insurance companies, medical facilities, laboratories, doctors, and hospitals can use the secure communication of digital confidential content to securely convey sensitive content, like medical information including pre-existing conditions, health check-up details, and insurance information; reasons for medical claims and for their denial, claim amounts, sum assured limits, etc.

Of course an ability of making the confidential content to vanish after a predetermined period of time or as soon as the receiver has read it, used it, or performed some other action, provides additional security.

Figure 12:
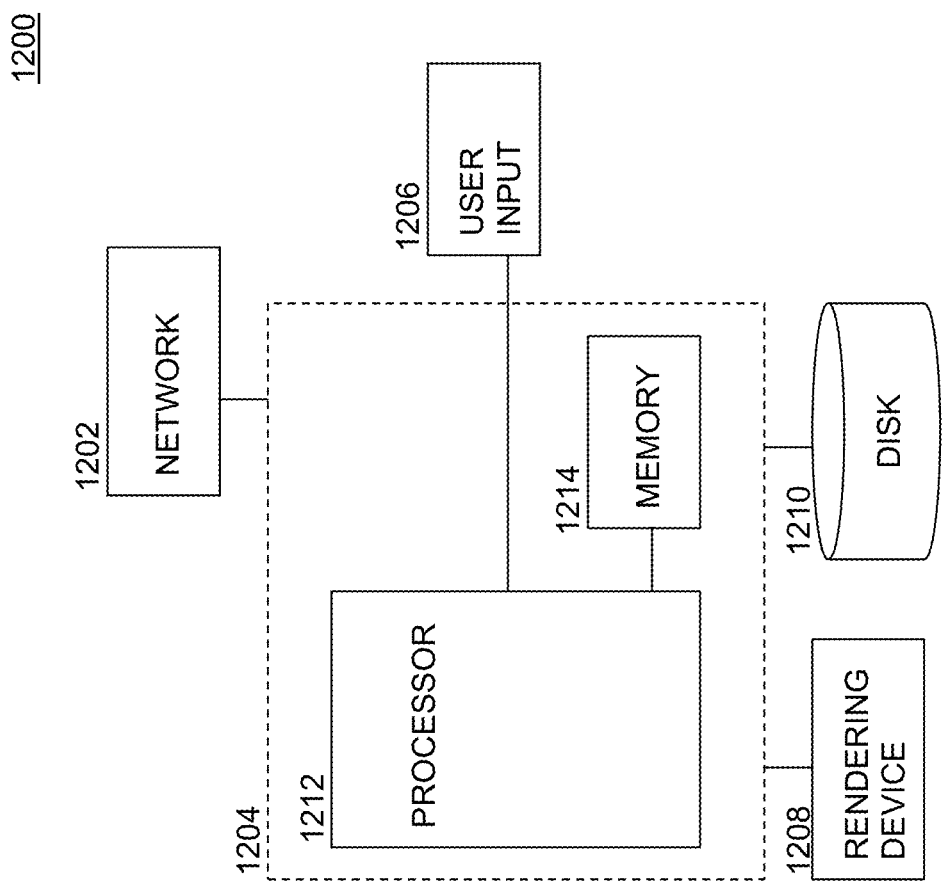
FIG. 12 is a diagram illustrating an example of a digital communication device in accordance with the preferred embodiment of the present inventive system.

Finally, FIG. 12 shows a system 1200 which represents an example of a computing device utilized to implement the present inventive system described above as well as the digital communication devices used by the participants. The system 1200 includes a computing device 1204 that has a processor 1212 operationally coupled to a memory 1214, a rendering device 1208, such as one or more of a display, speaker, etc., a user input device 1206 and a network 1202 operationally coupled to the computing device 1204. The application data and other content are received by the processor 1212 and are used to perform operation acts in accordance with the present inventive system and method. The operation acts include controlling at least one of the rendering device 1208 to render one or more of the GUIs and/or to render content in accordance with the present inventive system as illustrated in FIGS. 1a, 1b, 3a, 3b, 6a, 6b, 7a, 7b, 10a and 10b. The user input 1206 may include a keyboard, mouse, trackball or other devices, including touch sensitive displays, which may be stand alone or be a part of a system, such as part of a personal computer, personal digital assistant, mobile phone, converged device, or other rendering device for communicating with the processor 1212 via any type of link, such as a wired or wireless link. The user input device 1206 is operable for interacting with the processor 1212 including interaction within a paradigm of a UI such as a GUI and/or other elements of the present inventive system, such as to enable web browsing, content selection, such as provided by left and right clicking on a device, a mouse-over, pop-up menu, radio button, etc., such as provided by user interaction with a computer mouse, etc., as may be readily appreciated by a person of ordinary skill in the art.

In accordance with an embodiment of the present inventive system, the rendering device 1208 may operate as a touch sensitive display for communicating with the processors 1212 (e.g., providing selection of a web browser, a Uniform Resource Locator (URL), portions of web pages, etc.) and thereby, the rendering device 1208 may also operate as a user input device. In this way, a user may interact with the processor 1212. Clearly the user device 1204, the processor 1212, memory 1214, rendering device 1208, an optional disk 1210 and/or user input device 1206 may all or partly be portions of a computer system or other device, and/or be embedded in a portable device, such as a mobile telephone, personal computer (PC), tablet, personal digital assistant (PDA), converged device such as a smart telephone, etc.

The methods of the present inventive system are particularly suited to be carried out by a computer software program, such program containing modules corresponding to one or more of the individual steps or acts described and/or envisioned by the present inventive system. Such program may of course be embodied in a computer-readable medium, such as an integrated chip, a peripheral device or memory, such as the memory 1214 or other memory coupled to the processor 1212.

The computer-readable medium and/or memory 1214 may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling etc. Any medium known or developed that may store and/or transmit information suitable for use with a computer system may be used as the computer-readable medium and/or memory 1214.

Additional memories may also be used. The computer-readable medium, the memory 1214, and/or any other memories may be long-term, short-term, or a combination of long-term and short-term memories. These memories configure processor 1212 to implement the methods, operational acts, and functions disclosed herein. The operation acts may include controlling the rendering device 1208 to render elements in a form of a UI and/or controlling the rendering device 1208 to render other information in accordance with the present inventive system. The memories may be implemented as electrical, magnetic or optical memory, or any combination of these or other types of storage devices.

The network 1202 should be understood to include further network connections to other user devices, systems (e.g., servers), etc. While not shown for purposes of simplifying the following description, it is readily appreciated that the network 1202 may include an operable interconnection between processors, memories, displays and user inputs similar as shown for the user device 1204, as well as networked servers, such as may host web sites, etc. Accordingly, while the description contained herein focuses on details of interaction within components of the user device 1204 and other user devices and servers, it should be understood to similarly apply to interactions of other devices operably coupled to the network 1202.

The processor 1212 is capable of providing control signals and/or performing operations in response to input signals from the user input device 1206 and executing instructions stored in the memory 1214 or on disk 1210. The processor 1212 may be an application-specific or general-use integrated circuit(s). Further, the processor 1212 may be a dedicated processor for performing in accordance with the present inventive system or may be a general-purpose processor wherein only one of many functions operates for performing in accordance with the present inventive system. The processor 1212 may operate utilizing a program portion, multiple program segments, or may be a hardware device utilizing a dedicated or multi-purpose integrated circuit.

Thus, while the present inventive system has been described with reference to exemplary embodiments, it should also be appreciated that numerous modifications and alternative embodiments may be devised by those having ordinary skill in the art without departing from the broader and intended spirit and scope of the present inventive system as set forth in the claims that follow.

The section headings included herein are intended to facilitate a review but are not intended to limit the scope of the present inventive system. Accordingly, the specification and drawings are to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices, portions thereof, acts, etc., may be combined together or separated into further portions, acts, etc., unless specifically stated otherwise;
h) no specific sequence of acts or steps is intended to be required including an order of acts or steps indicated within a flow diagram; and
i) the term "plurality of" an element includes two or more of the claimed element, and does not imply any particular range of number of elements; that is, a plurality of elements may be as few as two elements, and may include an immeasurable number of elements.

What is claimed is:

1. A method of sharing confidential content among a plurality of participants, the content is provided as one or more elements of a digital conversation, each of the plurality of participants utilizing one or more digital communication devices connected to a network and configured to display the content, the method comprising steps of:
   registering two or more of the plurality of participants;
   on any of the one or more digital communication devices comprising the one or more elements:
      receiving a selection of at least one element of the one or more elements from the registered participants;
      designating the at least one element of the selection as confidential by setting a flag associated with the at least one element ON, wherein the at least one element of the selection is confidential when the flag is set ON, and is not confidential when the flag is set OFF, and
      displaying a place holder instead of the content of the at least one element designated as confidential;
   on any of the one or more digital communication devices comprising the at least one element designated as confidential:
      authenticating the registered participants;
      receiving a request to view the content of the at least one element designated as confidential from the plurality of participants; and
      displaying, without encoding and/or decoding, the content of the at least one element designated as confidential only to the authenticated registered participants.

2. The method of claim 1, wherein the network is the Internet and the connection is at least one of wired and wireless.

3. The method of claim 1, wherein the step of providing is selected from one of: creating, downloading via the network, copying from a fixed and/or removable medium, receiving via Bluetooth and receiving via wired and/or wireless network.

4. The method of claim 1, wherein the step of authenticating further comprises steps of:
   registering a passcode for uniquely identifying the registered participants; and
   supplying the passcode to the one or more digital communication devices prior to or at a time of the steps of receiving a selection of at least one element and receiving a request.

5. The method of claim 1, further comprising a step of associating a record having at least one flag uniquely with respective of the one or more elements, wherein the flag being ON indicates that the respective element is confidential and the flag being OFF indicates that the respective element is not confidential.

6. The method of claim 5, further comprising a step of distributing the record to the one or more digital communication devices of the participants.

7. The method of claim 6, wherein the step of distributing further comprises steps of:
   communicating information in the record to the one or more digital communication devices; and upon receipt
   establishing, on the one or more digital communication devices, a local copy of the record.

8. The method of claim 7, wherein the information in the local copy of the record indicates if displaying content of the designated confidential selection is allowed or prohibited.

9. The method of claim 1, further comprising steps of:
   before the step of designating,
   requesting to designate the received selection as confidential; and,
   electing for the designation one of: the received selection only and every received selection.

10. The method of claim 1, wherein the step of receiving a selection further comprises steps of:
    requesting to set a retention value; and
    setting the retention value.

11. The method of claim 10, wherein the step of setting the retention value further comprises the step of: electing that the retention value be set for one of: the received selection only and every received selection.

12. The method of claim 10, wherein the retention value is selected from at least one of: time and a number of views, the time indicates how long the selection is allowed to exist before it is deleted, and the number of views indicates how many times the selection is to be viewed before it is deleted.

13. The method of claim 10, wherein the step of setting the retention value sets a duration of retention in a field of a record uniquely associated with the one or more elements, the field not null or empty indicates that a retention value is set for the at least one element of the selection.

14. A method of sharing confidential content among a plurality of participants, the content is provided as one or more elements of a digital conversation, each of the plurality of participants utilizing one or more digital communication devices connected to a network and configured to display the content, the method comprising steps of:
    registering two or more of the plurality of participants;
    on any of the one or more digital communication devices comprising the one or more elements:
    receiving a selection of at least one element of the one or more elements from the registered participants;
    setting a retention value for the at least one element of the selection;
    designating the at least one element of the selection as confidential by setting a flag associated with the at least one element ON, wherein the at least one element of the selection is confidential when the flag is set ON, and is not confidential when the flag is set OFF, and
    displaying a place holder instead of the content of the at least one element designated as confidential:
    on any of the one or more digital communication devices comprising the at least one element designated as confidential:
    authenticating the registered participants;
    receiving a request to view the content of the at least one element designated as confidential from the plurality of participants;
    displaying, without encoding and/or decoding, the content of the at least one element designated as confidential only to the authenticated registered participants; and
    deleting the at least one element designated as confidential upon expiration of the retention value.

15. The method of claim 14, wherein
    the step of designating the selection as confidential comprises a step of requesting to designate the selection as confidential; and
    the step of setting a retention value further comprises a step of requesting to set the retention value.

16. The method of claim 15, wherein
    the step of requesting to designate, elects one of the received selection only, and every received selection to be designated as confidential; and
    the step of requesting to set the retention value elects that the retention value be set for one of: the received selection only and every received selection.

17. The method of claim 14, wherein: the step of designating the selection further comprises the step of associating a record having at least one flag uniquely with respective of the one or more elements, wherein the flag being ON indicates that the respective element is confidential and the flag being OFF indicates that the respective element of the selection is not confidential; and
    wherein the step of setting a retention value sets the retention value in a field of the record, the field not being null or empty indicates that a retention value is set for the at least one element of the selection, wherein the field maintains the running down or decrease of the retention value.

18. The method of claim 17, further comprising a step of distributing the record over the network to the one or more digital communication devices of the participants.

19. The method of claim 18, wherein the step of distributing further comprises steps of:
    communicating the information in the record; and upon receipt
    establishing, on the one or more digital communication devices, a local copy of the record,
    wherein the information in the local copy of the record indicates if displaying the content of the designated confidential selection is allowed or prohibited and when to delete the content associated with the designated confidential selection.

20. A non-transitory computer readable medium comprising computer readable code, which when executed by a computer performs a method of sharing confidential content among a plurality of participants, the content is provided as one or more elements of a digital conversation, each of the plurality of participants utilizing one or more digital communication devices connected to a network and configured to display the content, the method comprising steps of:
    registering two or more of the plurality of participants;
    on any of the one or more digital communication devices comprising the one or more elements:

receiving a selection of at least one element of the one or more elements from the registered participants;

designating the at least one element of the selection as confidential by setting a flag associated with the at least one element ON, wherein the at least one element of the selection is confidential when the flag is set ON, and is not confidential when the flag is set OFF, and displaying a place holder instead of the content of the at least one element designated as confidential;

on any of the one or more digital communication devices comprising the at least one element designated as confidential:

authenticating the registered participants;

receiving a request to view the content of the at least one element designated as confidential from the plurality of participants; and displaying, without encoding and/or decoding, the content of the at least one element designated as confidential only to the authenticated registered participants.

\* \* \* \* \*